July 3, 1951 J. O. MESA 2,559,454

CAPACITOR TYPE TRANSLATING SYSTEM
HAVING A VARYING REACTANCE

Filed July 18, 1945 3 Sheets-Sheet 1

Inventor:
Joseph O. Mesa
By Williams, Bradbury & Hinkle
Attorneys.

Inventor:
Joseph O. Mesa
By Williams, Bradbury & Hinkle
Attorneys.

Inventor:
Joseph O. Mesa
By Williams, Bradbury & Hinkle
Attorneys.

Patented July 3, 1951

2,559,454

UNITED STATES PATENT OFFICE 2,559,454

CAPACITOR TYPE TRANSLATING SYSTEM HAVING A VARYING REACTANCE

Joseph O. Mesa, Bayside, N. Y., assignor to Stewart-Warner Corporation, Chicago, Ill., a corporation of Virginia Application July 18, 1945, Serial No. 605,652

6 Claims. (Cl. 179—100.4)

The present invention relates to electrical translating systems and devices, and more particularly to pickup systems and pickups which may be used, for instance, as phonograph pickups.

The primary object of the present invention is the provision of a new and improved translating system and device.

A further object of the invention is to provide a new and improved pickup system and pickup of the capacitance type which is free of distortion.

A further object of the present invention is to provide a new and improved capacitance translating system employing the change in the reactance of a capacitor as the modulating factor, rather than the change in capacitance.

Another object of the present invention is to provide a new and improved translating system employing a capacitance type pickup having an increased effective depth of modulation.

A more specific object of the present invention is the provision of a new and improved translating system including a capacitance type pickup supplied with a carrier frequency wherein a portion of the carrier is canceled out to increase the effective depth of modulation.

Another more specific object of the present invention is the provision of a new and improved translating system including a capacitance type pickup having a capacitor with a central movable plate whereby the modulation components are added and the carrier components are partly canceled further to increase the effective depth of modulation.

Another object of the invention is the provision of new and improved capacitance type pickups characterized by a central movable capacitor plate.

Other objects and advantages of the present invention will become more apparent from the ensuing description thereof, in the course of which reference is had to the accompanying drawings, in which Fig. 1 is a graph depicting the change in capacitance of a condenser resulting from displacement of the movable plate of the capacitor;

Figure 1:
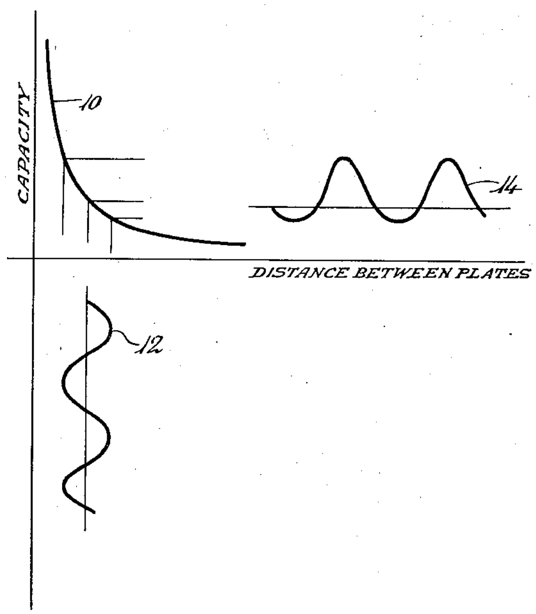

Reproducing or translating systems using capacitance type pickups are known. In one type the pickup delivers a modulation voltage proportional to capacitance. This type of pickup is a source of distortion which may be objectionable under certain conditions. The distortion results from the fact that the capacitance is inversely related to the thickness of the dielectric. This is illustrated in Fig. 1, in which curve 10 depicts the relation between capacitance and the distance between plates or the thickness of the dielectric.

If the displacement of the movable capacitor plate follows a sinusoid, as depicted in curve 12, the capacitance varies in the manner illustrated by curve 14. An analysis of curve 14, or of the output curve, indicates the presence of a second harmonic of about 26.5% and a third harmonic of about 7.2%.

The distortion in the output might be corrected as by using a suitable non-linear amplifier or by reducing the depth of the modulation. Thus, if the excursion of the movable plate on each side of its center position were one-twenty-fifth of the distance between plates, the second and third harmonics would have values of about 4.2% and 0.2%, respectively. However, it is desirable to have a large ratio of plate excursion to plate separation because of the fact that the lower the mechanical transfer impedance, the greater the plate displacement.

The present invention avoids the distortion described above even with deep modulation. The invention is based upon the utilization of a change in reactance of a capacitor, rather than a change in capacitance. Since the change in reactance is inversely proportional to change in capacitance, and the latter is inversely proportional to the change in position of the movable plate of the capacitor, it follows that the change is directly proportional to the displacement of the movable plate. Consequently, non-linear distortion is eliminated.

Figure 2:
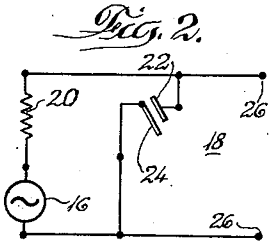
Fig. 2 is a schematic representation of one embodiment of the present invention.

One embodiment of the invention is illustrated in Fig. 2, to which reference will now be had.

The system includes a high frequency oscillator 16 operating, for example, at a frequency of 465 kc. (a frequency in the pass band of the I. F. amplifier of the receiver with which the device is to be used) supplying current to a capacitance type pickup 18 through a resistor 20. The resistance of resistor 20 is high compared to the reactance of the pickup at the oscillator frequency so that the current through the circuit is substantially constant and does not depend on the capacitance of the pickup. The pickup includes a stationary plate 22 and a movable plate 24, which may be actuated by a needle or other vibratory means. Output terminals 26 are connected across the pickup.

If the space between the plates of the pickup when the movable plate is in its center position is $d_1$ and if the plate displacement as a result of the record groove modulation is $a \sin \omega_s t$, then the reactance of the pickup is in the form $$k_1 (d_1 + a \sin \omega_s t)$$

or $$k_1 d_1 (1 + m \sin \omega_s t)$$

where $$m = \frac{a}{d_1} = \text{modulation factor}$$

If the oscillator or carrier voltage is $b \sin \omega_c t$, then the voltage across the pickup is in the form $$k_2 \sin \omega_c t \ (1 + m \sin \omega_s t)$$

The voltage across the pickup is thus an amplitude modulated carrier wave having a carrier frequency equal to the oscillator frequency and having a modulation depth which depends upon the displacement of the movable plate.

Figure 3:
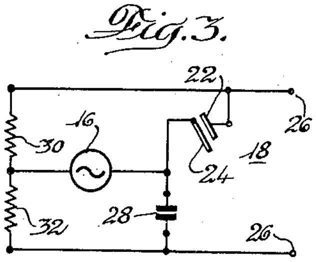
Fig. 3 is a similar representation of a modified embodiment.

An increased effective depth of modulation for a fixed displacement is obtained with the embodiment of the invention illustrated in Fig. 3. The variable capacitance pickup 18 having the stationary and movable plates 22 and 24 is connected to a fixed capacitor 28 having a capacitance somewhat greater than that of the pickup. The junction of the two capacitors is connected to the oscillator 16 and to the junction of the resistors 30 and 32 having resistance values which are large compared to the reactances of the capacitors at the frequency of the oscillator. The resistors are connected to the capacitors and both the resistors and capacitors are connected across the output terminals 26.

The current flow in the circuit 18, 16, 30 is constant, because of the high resistance of the resistor 30, and does not depend upon the capacitance of the pickup. The voltage across the capacitor 18 is directly proportional to its reactance, which, in turn, is directly proportional to the position (displacement) of the movable plate. Hence, the voltage across capacitor 18 is an amplitude modulated voltage wave having a carrier frequency determined by the oscillator frequency and having its modulation determined by the movement of the needle actuated movable plate.

The current flow in the circuit 28, 16, 32 is also constant but 180° out of phase with the current in circuit 18, 16, 30. The voltage across the fixed capacitor 28 is constant and may be considered to be an unmodulated carrier 180° out of phase with the carrier voltage across capacitor 18.

The output terminal voltage is the sum of the voltages across capacitors 18 and 28. Because the capacitance of capacitor 28 is larger than that of capacitor 18, a part of the carrier is canceled and the effective depth of modulation across the output terminals is greater than that obtaining across the capacitor 18.

Figure 4:
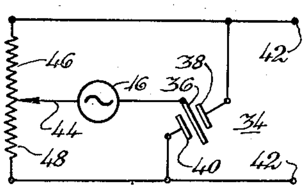
Fig. 4 is a similar representation of another modified embodiment.

The embodiment of the invention illustrated in Fig. 4 includes a capacitance type pickup 34 having a needle actuated movable center plate 36 and a pair of fixed plates 38 and 40 connected across output terminals 42. The oscillator 16 is connected to the movable plate 36 and a potentiometer including an adjustable connection 44 and a resistor having two portions 46 and 48 at opposite sides of the adjustable connection are also connected across the pickup. The resistors have resistance values which are high compared to the reactances of capacitors 36—38 and 36—40 of the pickup.

For reasons similar to those described in connection with Figs. 2 and 3, the voltages across each half of the pickup are amplitude modulated waves having a carrier frequency determined by the frequency of oscillator 16 and having its modulation determined by the displacement of the movable plate 36.

In this embodiment of the invention, both the carrier and modulation components of the voltages across the pickup halves are 180° out of phase. The output voltage appearing across terminals 42, being the sum of the two voltages, is a modulated wave in which, by proper adjustment, the carrier is partly canceled and the modulation components are added. The proper adjustment, which is accomplished by adjustment of the potentiometer, requires that the currents in the two circuits must be made to have magnitudes such that the instantaneous value of the voltage across the output terminals never reaches zero.

Figure 5:
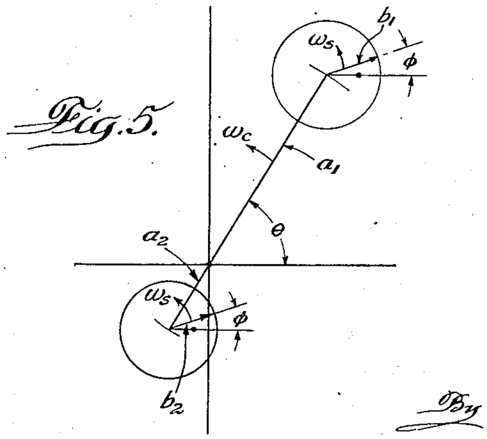
Figs. 5 and 6 are curves utilized in description of the operation of the embodiment of the invention illustrated in Fig. 4.
Figure 6:
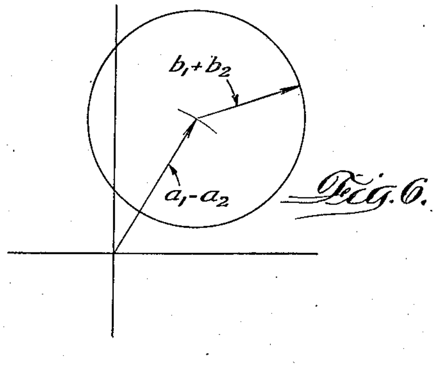

A more concise mathematical description of the operation of the embodiment of Fig. 3 follows, with particular reference to Figs. 5 and 6.

The voltage across one half (the upper, for example) of the pickup may be expressed, in the notation of rotating vectors, as $$e_1 = a_1 \exp [j(\omega_c t + \theta)] + b_1 \exp [j(\omega_s t + \phi)]$$

in which (as indicated in Figs. 5 and 6)

$a_1$=carrier amplitude, side 1
$b_1$=modulation amplitude, side 1
$\omega_c$=carrier angular velocity
$\omega_s$=modulation angular velocity
$\theta$=carrier initial phase angle
$\phi$=modulation initial phase angle The modulation is, by definition $$m_1 = \frac{b_1}{a_1}$$

The voltage across the other half (lower) of the pickup is $$e_2 = a_2 \exp [j(\omega_c t + \theta + \pi)] + b_2 \exp [j(\omega_s t + \phi)] = a_2 \exp [j(\omega_c t + \theta)] + b_2 \exp [j(\omega_s t + \phi)]$$

in which $a_2$=carrier amplitude, side 2
$b_2$=modulation amplitude, side 2

The voltage across the output terminals is $$e_1 + e_2 = (a_1 - a_2) \exp [j(\omega_c t + \theta)] + (b_1 + b_2 \exp [j(\omega_s t + \phi)]$$

The modulation factor is $$m = \frac{b_1 + b_2}{a_1 - a_2}$$

It is apparent, therefore, that the modulation factor can be varied or increased by suitable adjustment of the magnitudes of $a_1$ and $a_2$, i. e., the resistances of resistor portions 46 and 48. To avoid "over-modulation" distortion it is sufficient that $$b_1+b_2<a_1-a_2$$

Figure 7:
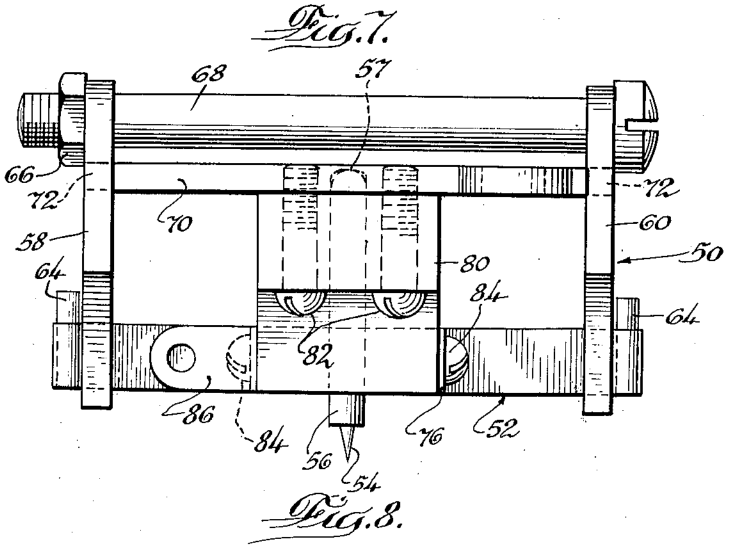
Fig. 7 is a front elevational view of a capacitance type pickup constructed in accordance with the present invention and especially suited for use in a system of the character illustrated in Fig. 4.
Figure 8:
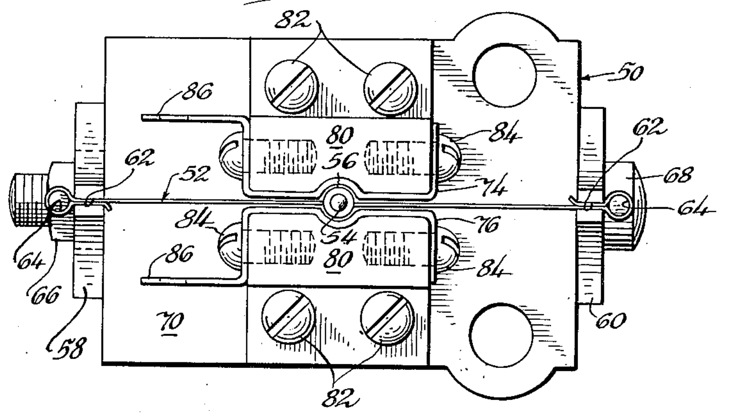
Fig. 8 is a bottom plan view of the pickup.
Figure 9:
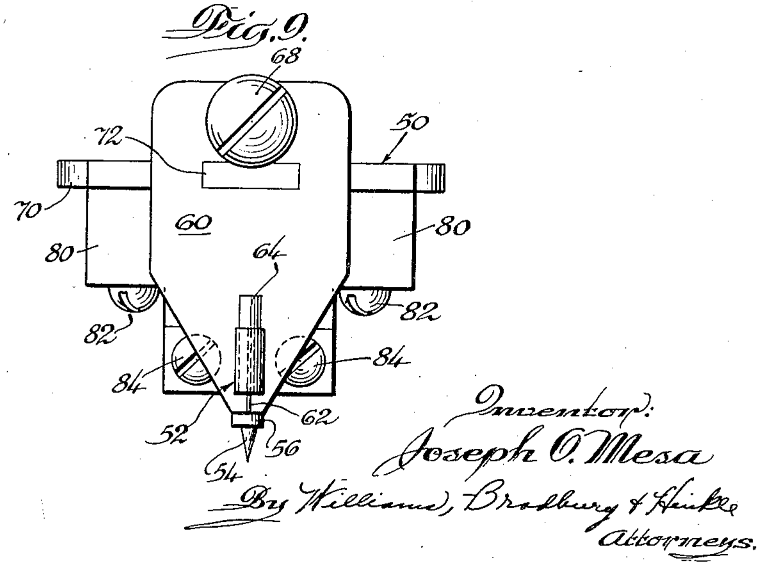
Fig. 9 is a side elevational view of the pickup.

The pickup illustrated in Figs. 7, 8, and 9, is especially suited for use in a system of the character disclosed in Fig. 4 and including a capacitor with a central movable plate. The illustrated pickup has a very high natural period of vibration, one above the audible range and in the neighborhood of 10,000 cycles per second. It is thus particularly adapted for use as a phonograph pickup.

The pickup, which is indicated as a whole by reference character 50, comprises a central capacitor plate 52 movable in suitable manner as by a record groove following needle 54 attached to the plate by a vertical support or shaft 56. The upper end of the shaft is rounded to seat in a rounded socket 57, to take the upward thrust of the shaft. The movable plate 52 is preferably a strip of Phosphor bronze about ⅛" wide and about .004 inch thick. It is secured to the shaft in suitable manner, for instance, the shaft may be slotted to receive the strip and then the two may be welded together. The plate is stretched taut between a pair of downwardly extending end plates 58 and 60 having narrow slits 62 at their lower generally triangular ends through which the ends of the strip are reversely bent around securing pins 64.

The tension applied to the plate 52 may be adjusted by a nut 66 secured to the threaded end of a bolt 68 passing through the upper ends of the end plates. The end plates are spaced apart by a top plate 70 having reduced end portions 72 passing through suitable apertures in the end plates, whereby the end plates are angularly movable to adjust the tension applied to plate 52.

The capacitor includes the stationary plates 74 and 76 located at opposite sides of the central movable plate 52. They are secured to downwardly extending supports 80 of insulating material secured to the underside of the top plate 70 by screws 82. The plates 74 and 76 are secured to the insulating support by screws 84 and the plates are provided with terminal extensions 86.

The pickup illustrated in Figs. 7, 8, and 9 thus comprises a central movable plate located between two stationary plates. When the needle is in cooperative relation with a record groove, the movable plate 52 is displaced laterally according to the modulation of the record in the manner of the pickup 34 illustrated schematically in Fig. 4.

Figures 10, 11:
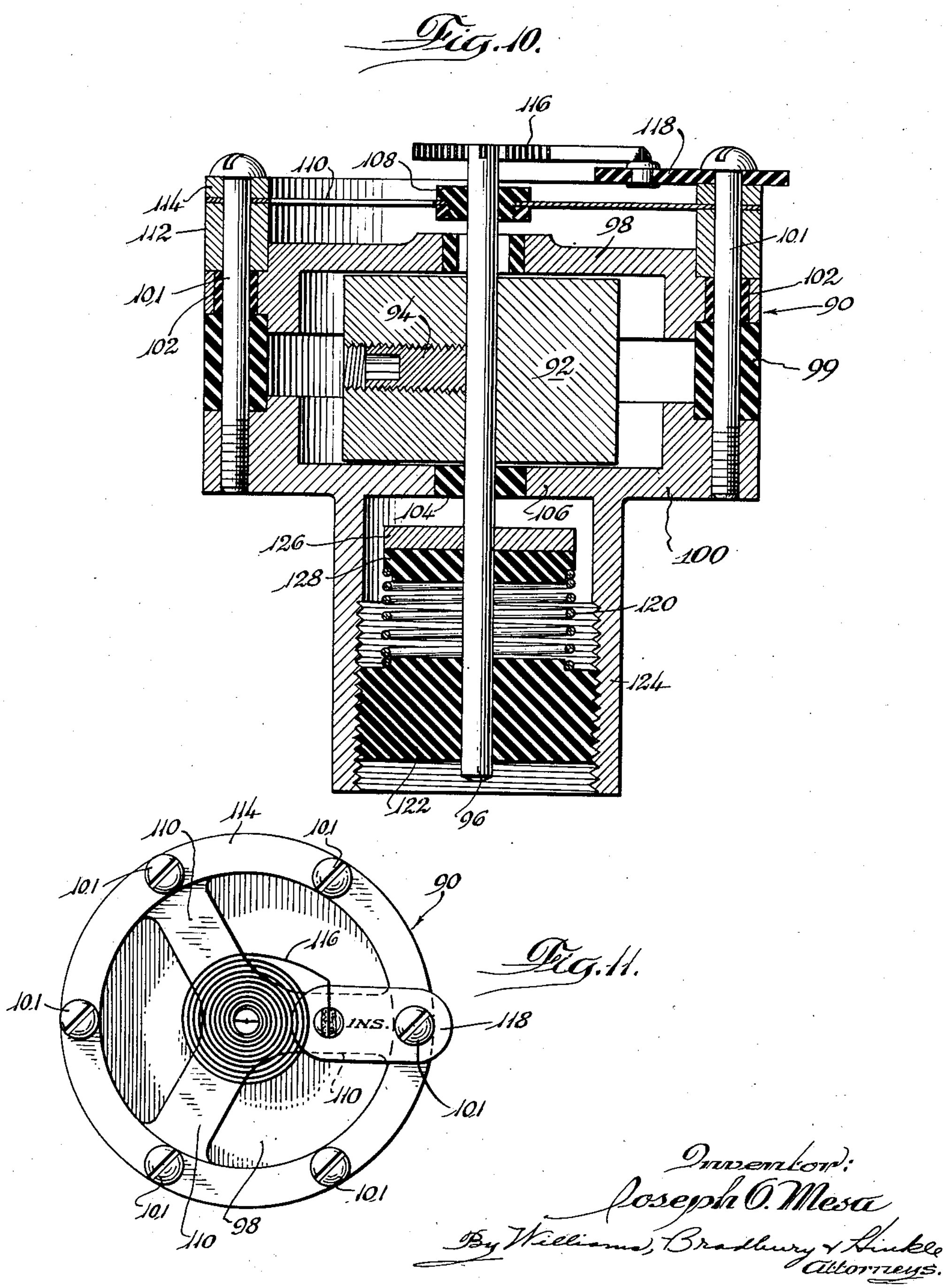
Fig. 10 is a vertical cross sectional view of another pickup of a type utilizable in the system of Fig. 4.
Fig. 11 is a top plan view of the pickup.

The pickup illustrated in Figs. 10 and 11 is constructed and arranged to have a very low natural period of vibration, e. g., about one cycle per second. It is also intended to be used in a different type of apparatus, such as wheel balancing equipment, wherein the movable part of the pickup capacitor is moved in response to vibrations generated by the vibrations of the wheel.

Referring now to Figs. 10 and 11, it may be noted that the capacitor type pickup, indicated as a whole by reference character 90, includes a cylindrical central movable plate 92 of substantial size and preferably made of lead so as to be quite heavy. It is secured as by a set screw 94 to an intermediate portion of a vertically movable actuating shaft 96 mounted upon and insulated from a pair of stationary capacitor plates 98 and 100.

The stationary capacitor plates are separated from each other by an annular ring 99 of insulating material suitably apertured to receive screws 101 for securing the plates and ring in assembled relationship. The screws are insulated from the upper plate 98 by bushings 102.

The movable plate actuating shaft 96 is slidably and rotatably received in a bushing 104 located in a horizontal portion 106 of the lower plate 100, and a bushing 108 held centrally of the pickup by a resilient spider 110 secured above the upper plate 98 by the screws 101 and spaced from the upper plate by an annular ring 112. An annular ring 114 is located above the spider better to hold it at its peripheral region.

The shaft 92 is resiliently held against rotation by a hair spring 116 secured to the upper end of the shaft and to a support 118 of insulating material secured above the ring 114 by one of the screws 101.

The movable capacitor plate 92 is held centrally in spaced relation to the capacitor plates 98 and 100 by resilient means including a helical spring 120 supporting the shaft. The lower end of the spring rests upon an externally threaded adjustably mounted supporting nut 122 secured inside of a tubular extension 124 of the capacitor plate 100. The upper end of the spring supports structure fixedly secured to the shaft 96 and consisting of a circular collar 126 and and an externally flanged spring abutment 128 preferably made of insulating material. The spring 120 is adjusted by rotation of the nut 122 centrally to locate the movable plate 92, e. g., so that it has a clearance of about .005" relative to the two stationary plates 98 and 100.

In use, the pickup is secured to the vehicle so that the housing, including the stationary plates 98 and 100, is stationary with respect to the vehicle. The plate 92 moves relative to the plates 98 and 100 in response to the vibrations induced by rotation of the vehicle wheel, thereby to produce the displacement between the stationary and movable plates contemplated with the system of Fig. 4.

While the present invention has been described in connection with the specific details of several embodiments thereof, it should be understood that these details are not intended to be limitative of the invention except in so far as set forth in the accompanying claims.

Having thus described my invention, what I claim as new and desire to secure by United States Letters Patent is as follows:

1. A capacitance type pick-up, including in combination, a relatively thin and narrow ribbon of conductive material constituting a movable capacitor plate, means including a pair of slotted end plates through which the ribbon extends at its ends and a top plate movably supporting said end plates, and means securing said end plates to said top plate in adjusted position for maintaining said ribbon under tension, a needle carrying shaft secured to said ribbon for moving it, and a pair of stationary capacitor plates located one at each side of said movable ribbon and secured to said top plate.

2. Apparatus for translating vibrations into electrical signals, comprising a source of carrier voltage having a frequency much greater than the highest frequency of the vibrations, a vibration pickup including a capacitor which is variable in response to the vibrations, means including a resistance means connecting the pickup to said source for producing a flow of carrier frequency current through the capacitor, and a plurality of output terminals connected with said capacitor to derive electrical signals that develop across the capacitor, the value of said resistance means being much greater than the reactance of the capacitor at the carrier frequency so that the carrier frequency current through the capacitor is substantially constant regardless of vibratory variations of the capacitor.

3. An apparatus for translating vibrations into electrical signals, comprising a vibration pickup including a pair of stationary electrodes and an electrode movable in response to the vibrations, the electrodes thereby constituting a pair of variable capacitors, resistance providing means connected across the stationary electrodes, a source of carrier frequency voltage connected with the resistance providing means and with the movable electrode to produce carrier frequency currents through the capacitors respectively, the carrier source having a frequency much higher than the highest vibration frequency, and a pair of output terminals connected across the stationary electrodes for deriving output signals, the value of the resistance providing means being much greater than the reactances of the capacitors at the carrier frequency so that the carrier frequency currents are substantially constant and are not affected appreciably by vibratory variations of the capacitors.

4. Apparatus for translating vibrations into electrical signals, comprising a vibration pickup including a pair of stationary electrodes and an electrode movable in response to vibrations, the electrodes thereby constituting a pair of series connected variable capacitors, an adjustable resistance potentiometer connected across the stationary electrodes, a source of carrier frequency connected with the movable electrode and with the potentiometer to produce carrier frequency currents through the capacitors, and a pair of output terminals connected across the stationary electrodes for deriving output signals, the resistance of the potentiometer being much greater than the reactances of the capacitors at the carrier frequency so that the carrier frequency currents are not affected appreciably by vibratory variations of the capacitors but said currents are substantially constant.

5. A capacitance type pickup, comprising a movable capacitor electrode including a relatively thin and narrow conductive ribbon having ends adapted to be held for tensioning the ribbon, a pair of transverse end plates constituting tensioning levers having slots in their lower ends through which the ends of the ribbon respectively, extend, a top fulcrum plate spacing apart the end plates, a tension member adjustable to tilt the upper ends of the end plates inwardly for maintaining the ribbon under tension, and a shaft secured to the ribbon intermediate its ends and having a record needle at its lower end, the top plate being provided with a socket for receiving the upper end of the shaft, and a pair of stationuary capacitor electrodes secured to the top plate and positioned respectively adjacent each side of the ribbon.

6. Apparatus for translating vibrations into electrical signals, comprising a source of carrier frequency voltage, a pair of capacitors connected in series, one of said capacitors having a fixed capacitance and the other being variable in response to vibrations, a pair of series connected resistors connected across the series connected capacitors, means connecting the source across the junction of the resistors and the junction of the capacitors for producing carrier frequency currents through the respective capacitors, and a pair of output terminals connected across the series connected capacitors for deriving output signals, the resistances of said resistors respectively being much greater than the reactances of said capacitors respectively so that the carrier frequency currents through the respective capacitors are substantially constant regardless of vibratory variations of the variable capacitor.

JOSEPH O. MESA.

REFERENCES CITED

The following references are of record in the file of this patent:

UNITED STATES PATENTS

| Number | Name | Date |
|---|---|---|
| 1,702,438 | High | Feb. 19, 1929 |
| 1,755,739 | Kositzky | Apr. 22, 1930 |
| 1,786,436 | Leffler | Dec. 30, 1930 |
| 1,796,155 | Leffler | Mar. 10, 1931 |
| 1,799,974 | Conrad | Apr. 7, 1931 |
| 2,008,713 | Hayes | July 23, 1935 |
| 2,055,736 | Terman | Sept. 29, 1936 |
| 2,140,769 | Schienemann | Dec. 20, 1938 |
| 2,182,377 | Guanella | Dec. 5, 1939 |
| 2,212,389 | Chorpening | Aug. 20, 1940 |
| 2,252,057 | Blessing | Aug. 12, 1941 |
| 2,319,622 | Miessner | May 18, 1943 |
| 2,376,456 | Sinnett | May 22, 1945 |
| 2,386,049 | Hausz | Oct. 2, 1945 |